US012379739B1

(12) United States Patent
Higgs

(10) Patent No.: US 12,379,739 B1
(45) Date of Patent: Aug. 5, 2025

(54) MODULAR CONTROLLER SYSTEM FOR USE WITH A WEAPON

(71) Applicant: Spencer Ryan Higgs, Havelock, NC (US)

(72) Inventor: Spencer Ryan Higgs, Havelock, NC (US)

( * ) Notice: Subject to any disclaimer, the term of this patent is extended or adjusted under 35 U.S.C. 154(b) by 0 days.

(21) Appl. No.: 19/208,161

(22) Filed: May 14, 2025

(51) Int. Cl.
*F41C 23/10* (2006.01)
*G05G 9/047* (2006.01)

(52) U.S. Cl.
CPC ............. *G05G 9/047* (2013.01); *F41C 23/10* (2013.01); *G05G 2009/04774* (2013.01)

(58) Field of Classification Search
CPC ........... F41C 23/10; F41C 23/16; F41C 23/00
See application file for complete search history.

(56) References Cited

U.S. PATENT DOCUMENTS

| | | | |
|---|---|---|---|
| 8,430,753 B2 | 4/2013 | Ikeda et al. | |
| 10,675,546 B2 | 6/2020 | Muramatsu | |
| 11,027,192 B1 | 6/2021 | Zust | |
| 11,114,267 B2 | 9/2021 | Paquette et al. | |
| 12,303,776 B1 | 5/2025 | Higgs | |
| 2003/0054883 A1 | 3/2003 | Sakiyama et al. | |
| 2003/0112293 A1 | 6/2003 | Shimizu et al. | |
| 2009/0054146 A1 | 2/2009 | Epstein et al. | |
| 2018/0161670 A1 | 6/2018 | Boev | |
| 2019/0186867 A1* | 6/2019 | Bruhns | F41C 23/22 |
| 2022/0003519 A1* | 1/2022 | Leon-Guerrero | F41C 23/16 |
| 2023/0090962 A1 | 3/2023 | Franco | |
| 2025/0164209 A1* | 5/2025 | Hedeen | F41G 1/35 |

* cited by examiner

*Primary Examiner* — J. Woodrow Eldred
(74) *Attorney, Agent, or Firm* — Ashley D. Johnson; Dogwood Patent and Trademark Law

(57) ABSTRACT

The invention is a controller system that can be used with or integrated with one or more weapons, such as a gun. The controller system includes a grip comprising one or more buttons and an optional thumb stick. The system also includes a base with an interior that houses the button circuitry. The base includes an opening that facilitates attachment to the weapon. When installed, the controller system allows the single hand of the user to access the grip buttons and the trigger of the weapon to simultaneously control the weapon and an accessory device, such as a drone.

15 Claims, 10 Drawing Sheets

MODULAR CONTROLLER SYSTEM FOR USE WITH A WEAPON

FIELD OF THE INVENTION

The presently disclosed subject matter is directed to a modular controller system for use with a weapon. The disclosed system allows users to fully grasp and manipulate a weapon (e.g., a firearm), as well as simultaneously and seamlessly control one or more additional accessories. The presently disclosed subject matter also includes methods of making and using the disclosed system.

BACKGROUND OF THE INVENTION

Weapons (such as guns) are often used and collected by sportsmen and other individuals for sport and shooting. In addition, weapons are often used in association with many jobs, such as military duty and law enforcement careers. During use, many weapons users often control their weapon in addition to one or more accessories, such as drones, robotic devices, and the like. However, attempting to use both a weapon and an accessory is both time consuming and cumbersome. For example, the user must put the weapon down and then use an associated controller to manipulate the accessory device(s). As such, it would be advantageous to provide an interactive controller system that can be easily integrated into a weapon, allowing a user to control the weapon in addition to one or more accessory devices at the same time.

SUMMARY OF THE INVENTION

In some embodiments, the presently disclosed subject matter is directed to a controller system for installing on a weapon. Specifically, the controller system comprises a grip defined by a front face comprising one or more buttons and a rear face. The system also includes a base comprising a first end defined by an opening and a channel and an opposed second end. When installed on a weapon, the grip buttons are accessible by a middle finger, ring finger, and pinkie finger of a user while a pointer finger of the user is positioned adjacent to a trigger of the weapon, allowing a single hand of the user to access the grip buttons and the trigger of the weapon. The grip buttons control a feature of an accessory device. The weapon has an original buttstock and pistol grip removed and replaced by the grip and base.

The "thumb" is the first digit of the human hand, next to the index finger and when a person is standing the in the medical anatomical position (where the palm is facing to the front) the thumb is the outermost digit. The "pointer finger" (or index finger) is the second digit of the human hand, located between the thumb and the middle finger. The "middle finger" is the third digit of the human hand, located between the pointer finger and the ring finger. The "ring finger" is the fourth digit of the human hand, located between the middle finger and the pinkie finger. The "pinkie finger" is the fifth digit of the human hand, and is also the most ulnar and smallest digit, positioned next to the ring finger.

In some embodiments, the grip comprises three buttons.

In some embodiments, the grip includes a thumb stick accessible by a thumb of a user while the pointer finger of the user is positioned adjacent to the trigger of the weapon. For example, the pointer finger can contact the trigger and active the trigger during use (without moving the remainer of the user's hand).

In some embodiments, the system includes a forward control comprising a second set of buttons, a thumb stick, or both, where the forward control is positioned on a handguard of the weapon. The "handguard" refers to a guard that attaches to the front of a firearm and fully or partially encompasses the firearm barrel, providing protection from the barrel (which can become hot during use). The forward control is accessible by a second hand of the user (the first hand positioned on or adjacent to the grip). The forward control is on the forward portion of the weapon, such that the user's second arm is fully or partially outstretched during use.

In some embodiments, the weapon is a gun. The term "gun" refers to any device that has an elongate tube or barrel through which projectiles (such as bullets or missiles) are fired. Thus, the term "gun" includes any type of firearm, including a pistol, revolver, shot gun, double barrel shotgun, and the like.

In some embodiments, the accessory device is selected from one or more drones, robotic devices, aircraft, artificial satellites, unmanned aerial vehicles, cameras, self-driving vehicles, weapon arrays, sensors, information/communication devices, ground and underwater equipment, probes, or combinations thereof. The term "drone" refers to one of various types of autonomous or semi-autonomous vehicles (e.g., aircraft, land vehicles, waterborne vehicles, or a combination thereof) that may or may not operate without onboard human pilots/drivers. The term "aircraft" refers to a machine capable of flight, including, but not limited to, BWB aircraft, traditional aircraft, unmanned aerial vehicles (UAVs), drones, blimps, dirigibles, personal aircrafts (e.g., jetpacks), and/or vertical take-off and landing (VTOL) aircraft. The term "robotic" refers to a device whose movements can be controlled remotely and/or by stored programming (the device may operate autonomously, semi-autonomously or entirely under operator control). The term "artificial satellite" refers to refers to an object that may fly and move around the earth along a predetermined circular or elliptical orbit. The term "aerial vehicle" refers to an aircraft that does not require a human pilot on board to operate the aircraft. The term "camera" refers to any device capable of capturing a digital image. The term "self-driving vehicle" refers to a vehicle that travels without an operation of a user or with a minimum operation of a user. The term "weapon array" refers to a plurality of weapons (of the same type or a different type) that may be positioned at a single location or within a set location of adjacent weapons. The term "sensor" refers to a device that detects or measures a physical property and enables the recording, presentation or response to such detection or measurement using processor and optionally memory. The term "probe" refers to a tool or instrument designed for examining a quality or characteristic of an element. The term "communication device" refers to an electronic computing device having a wireless transceiver (e.g., cell phones, smart phones, tablet computers, netbooks, laptops, personal data assistants, and desktop computers). The term "ground and underwater equipment" refers to any element positioned on the ground and/or underwater, such as navigation systems and the like.

In some embodiments, the base includes an interior that houses circuitry of the system components, such as (but not limited to) circuitry for the buttons, thumb sticks, transmitter, and/or combinations thereof. An electronic circuit includes individual electronic components, such as resistors, transistors, capacitors, inductors and diodes, connected by conductive wires or traces through which electric current can flow. It is a type of electrical circuit. For a circuit to be referred to as electronic, rather than electrical, generally at least one active component must be present. The combination of components and wires allows various simple and complex operations to be performed: signals can be amplified, computations can be performed, and data can be moved from one place to another.

In some embodiments, the grip buttons are modular.

In some embodiments, the system includes a circuit board cartridge removably positioned at one end of the base that allow communication with a receiver on the accessory device. A "circuit board" refers to substrate comprising one or more layers manufactured so as to have one or more electronic components assembled with it to form an electrical or electronic circuit. A receiver converts transmitted waves or signals into a desired form of output.

In some embodiments, the presently disclosed subject matter is directed to a gun comprising the disclosed controller system.

In some embodiments, the presently disclosed subject matter is directed to a method of using the disclosed controller system. Specifically, the method comprises installing the base on the weapon. In some embodiments, the installation can include positioning a weapon buffer tube within the base opening. The method includes installing the grip on the weapon adjacent to the weapon trigger. The grip buttons are accessible by the middle finger, ring finger, and pinkie finger of the user while the pointer finger of the user is positioned adjacent to the weapon trigger. The grip buttons are used to control one or more features of the accessory device.

In some embodiments, the grip of the controller system includes a thumb stick accessible by a thumb of a user while the pointer finger of the user is positioned adjacent to the trigger of the weapon.

DETAILED DESCRIPTION OF THE INVENTION

Figure 1:
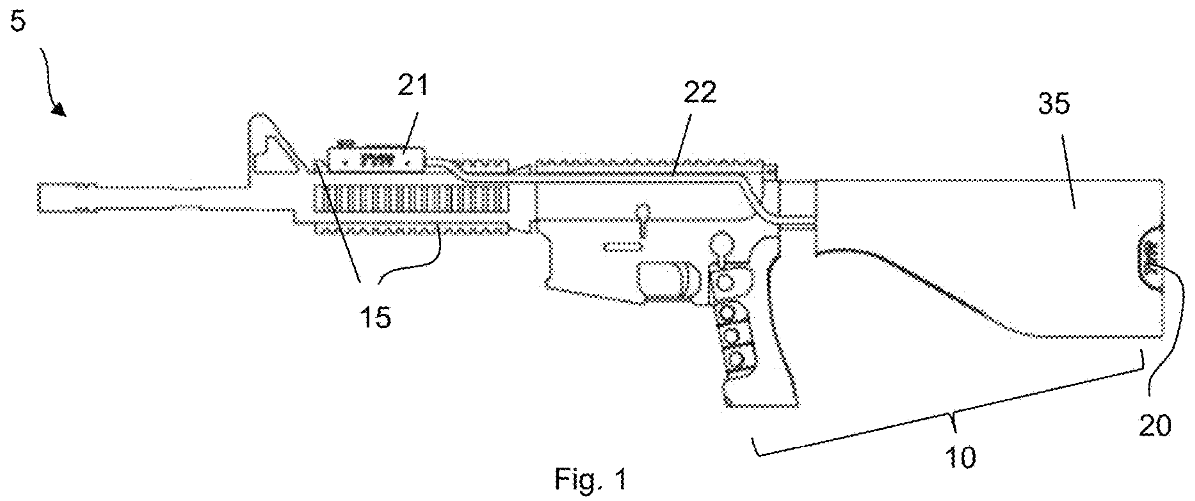
FIG. 1 is a side plan view of a weapon comprising a controller system in accordance with some embodiments of the presently disclosed subject matter.

For the purpose of promoting an understanding of the principles of the present disclosure, reference will now be made to preferred embodiments and specific language will be used to describe the same. It will nevertheless be understood that no limitation of the scope of the disclosure is thereby intended, such alteration and further modifications of the disclosure as illustrated herein, being contemplated as would normally occur to one skilled in the art to which the disclosure relates.

Articles "a" and "an" are used herein to refer to one or to more than one (i.e., at least one) of the grammatical object of the article. By way of example, "an element" means at least one element and can include more than one element. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise indicated, all numbers expressing quantities of components, conditions, and so forth used in the specification and claims are to be understood as being modified in all instances by the term "about." Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments +/−20%, in some embodiments +/−10%, in some embodiments +/−5%, in some embodiments +/−1%, in some embodiments +/−0.5%, and in some embodiments +/−0.1%, from the specified amount, as such variations are appropriate in the disclosed packages and methods. Thus, the term "about" is used to provide flexibility to a numerical range endpoint by providing that a given value may be "slightly above" or "slightly below" the endpoint without affecting the desired result.

As used herein, the term "and/or" includes any and all combinations of one or more of the associated listed items.

Relative terms such as "below" or "above" or "upper" or "lower" or "horizontal" or "vertical" may be used herein to describe a relationship of one element, layer, or region to another element, layer, or region as illustrated in the drawing figures. It will be understood that these terms and those discussed above are intended to encompass different orientations of the device in addition to the orientation depicted in the drawing figures.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

All methods described herein can be performed in any suitable order unless otherwise indicated herein or otherwise clearly contradicted by context. The use of any and all examples, or exemplary language (e.g., "such as") provided herein, is intended merely to better illuminate the invention, and does not pose a limitation on the scope of the invention unless otherwise claimed. No language in the specification should be construed as indicating any unclaimed element as essential to the practice of the invention.

Unless otherwise defined, all technical terms used herein have the same meaning as commonly understood by one of ordinary skill in the art to which this disclosure belongs.

The presently disclosed subject matter is directed broadly to a controller system that can be used with or integrated with one or more weapons. The term "weapon" broadly refers to any device configured to discharge projectiles or other materials. Thus, weapons can include (but are not limited to) any type of firearm (e.g., pistol, revolver, shotgun). In some embodiments, the weapons can include military guns comprising any large-caliber, direct-fire, high-velocity, flat-trajectory artillery piece employing an explosive-filled hollowed metal shell or a solid bolt as its primary projectile. In some embodiments, the weapon can comprise a gun, including any firearm having a stock where a portion of the stock extends forward of the trigger but short of the muzzle end of the barrel (e.g., small arms such as rifles, pistols and machine guns).

Figure 2:
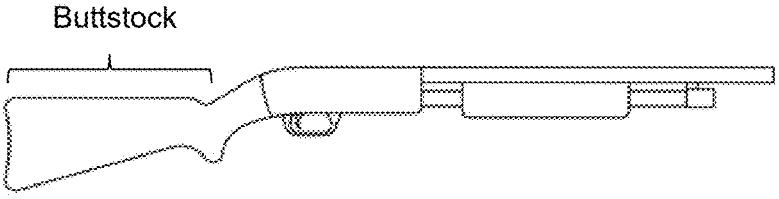
Fig. 2 PRIOR ART
FIGS. 2 and 3 are prior art weapons in accordance with some embodiments of the presently disclosed subject matter.
Figure 3:
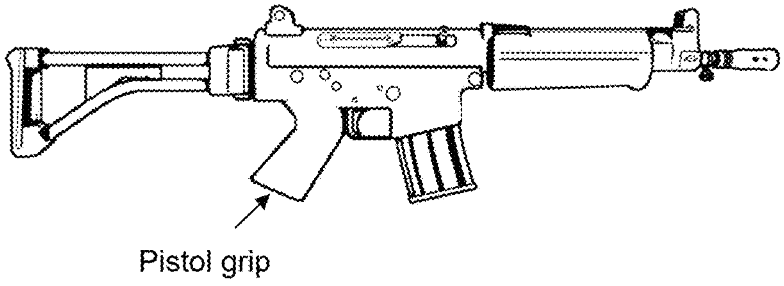
Fig. 3 PRIOR ART
Figure 4A:
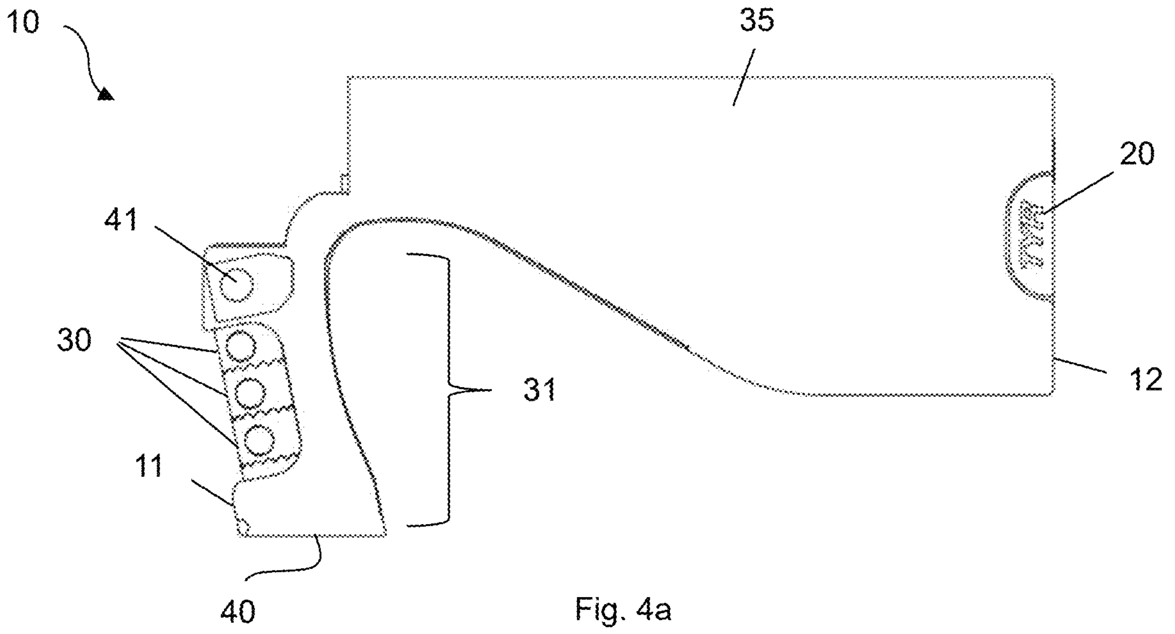
FIGS. 4*a* and 4*b* are side plan views of a controller system in accordance with some embodiments of the presently disclosed subject matter.
Figure 4B:
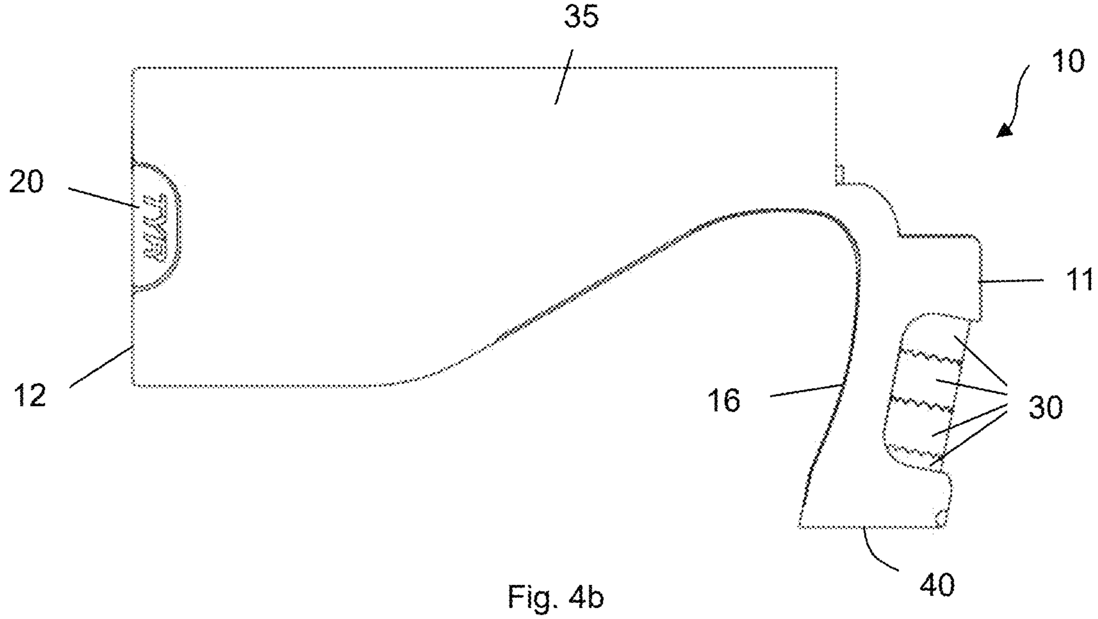
Figure 4C:
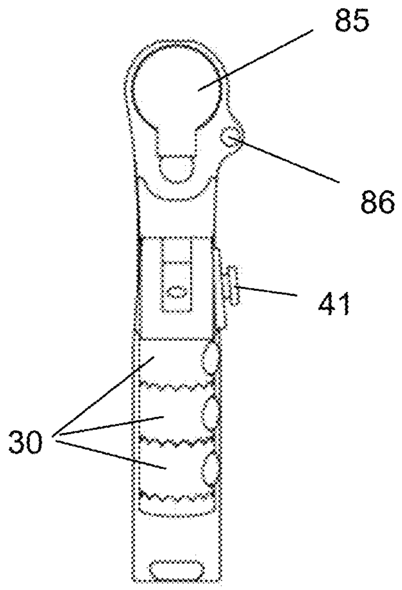
FIG. 4*c* is a front plan view of a controller system in accordance with some embodiments of the presently disclosed subject matter.
Figure 4D:
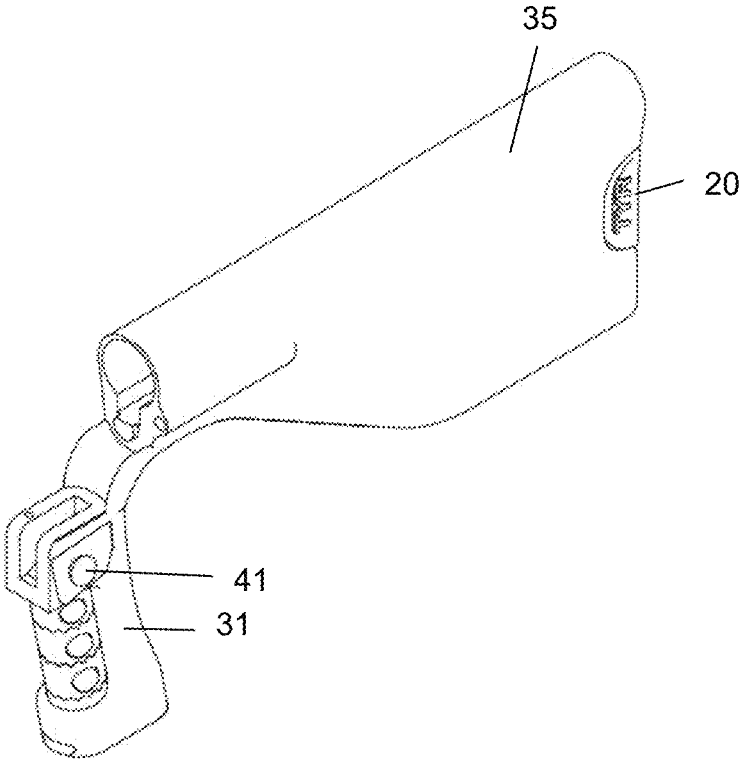
FIG. 4*d* is a perspective view of a controller system in accordance with some embodiments of the presently disclosed subject matter.

FIG. 1 illustrates one embodiment of weapon 5 comprising controller system 10. The term "controller" includes a device that provides input to a receiver, such as (but not limited to) a drone, robot, etc. As shown in FIG. 1, in some embodiments the controller system can replace the weapon's buttstock and pistol grip and can include forward control unit 21 to the forward handguard 15 of the weapon (e.g., firearm). The term "buttstock" refers to furthermost (rearward) portion of a conventional gun supported by the user during firing, including collapsible stocks, folding stocks and pistol grip stocks, as illustrated in FIG. 2. The term "pistol grip" refers to a distinctly protruded grip positioned underneath the main mechanism of a conventional firearm, held by a user to provide ergonomic positioning, as shown in FIG. 3. The weapon "handguard" refers to a guard that attaches to the front of the firearm and encompasses the firearm barrel, as illustrated in FIG. 1.

Advantageously, controller system 10 provides controls along one or more of the normal holding points of a firearm that can be used to operate a secondary device (e.g., one or more drones, robots, and the like). As a result, a user can operate weapon 5 in addition to a plurality of different accessory devices remotely, without the need to put down the firearm and use a separate two-handed controller. Controller system 10 therefore adds an additional capability to weapon 5 without affecting the normal operation of the firearm. Thus, when configured as a firearm, the weapon can effectively be fired at a target while simultaneously controlling and/or directing a secondary device.

FIGS. 4*a*-4*d* illustrate one embodiment of controller system 10, comprising grip 31 that includes a plurality of buttons 30 positioned at first end 11 and optional circuit board 20 inserted at the opposed second end 12. Base 35 properly orients the buttons and provides a butt stock, as well as interacts with the circuit board when included. In some embodiments, the base can act as a support and/or receptacle that includes circuitry for the buttons, thumb sticks, forward controls, and/or circuit board 20 as described in detail below. Bottom 40 of the controller includes no connections and can be configured as a flat area in some embodiments.

Grip 31 can easily be grasped by a user's hand. Thus, the term "grip" broadly refers to a portion of a device that can be contacted by all or a part of a user's hand during use. In some embodiments, the grip can be elongated to allow the user's fingers and thumb to wrap around the controller for easy gripping and access to buttons 30. The grip is also sized and shaped to allow a user's pointer finger to easily access the trigger of an associated gun 5. The "trigger" is the mechanism that actuates the function of a ranged weapon (such as a firearm). Grip 31 is shaped and dimensioned to be grasped by a single hand. To this end, the grip may be ergonomically contoured to allow for comfortable grasping. For example, the grip can include a cylindrical or semi-cylindrical shape with two planar surfaces. In some embodiments, the palm of a user rests naturally along the grip (e.g., at user-facing side 16). Optionally, all or a portion of grip 31 can include a gripping surface material or an adhesive to prevent slippage between the palm and/or fingers of a user. The coverage area of the material may be an externally applied adhesive coating, or the material may be impregnated within the curved surface itself.

As noted above, the grip includes a plurality of buttons 30 that control other functions of the accessory device being controlled. The term "accessory device" broadly includes any device that can be maneuvered or controlled by the controller (e.g., drones, robotic devices, aircraft, artificial satellites, unmanned aerial vehicles, cameras, self-driving vehicles, weapon arrays, sensors, information/communication devices, ground and underwater equipment, probes, and any other automated devices).

Figure 5A:
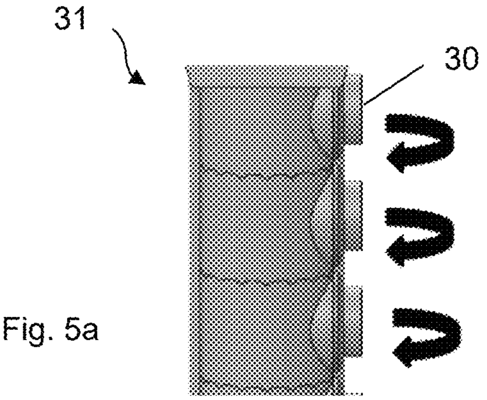
FIGS. 5*a*-5*c* are front plan view of a grip buttons in accordance with some embodiments of the presently disclosed subject matter.
Figure 5B:
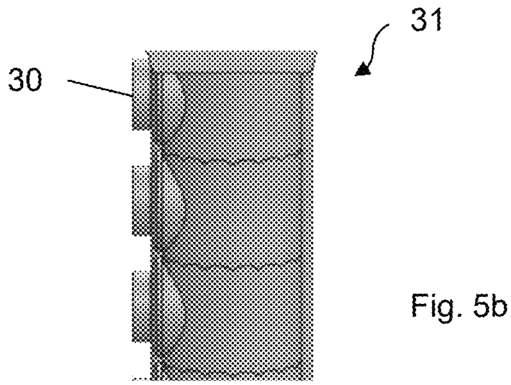
Figure 5C:
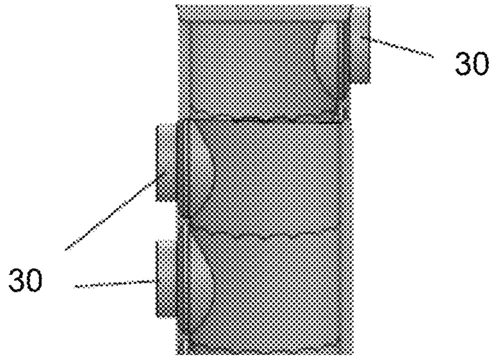

In some embodiments, buttons 30 of the grip can be rotatable. The orientation of each button 30 can be independently moved relative to the other buttons. For example, some or all of the buttons can be oriented for right-handed or left-handed use. Advantageously, each button 30 can be rotatable 180 degrees (e.g., at least/no more than about 10, 20, 30, 40, 50, 60, 70, 80, 90, 100, 110, 120, 130, 140, 150, 160, 170, or 180 degrees) from a first position to a second position on the controller grip. For example, the controller can allow a user to switch from left to right-handed use (and vice versa) by rotating the buttons about 180 degrees, as shown in FIGS. 5*a* and 5*b*. Thus, the buttons on the controller grip can be rotated to accommodate both left and right handed users. Each button 30 can independently rotate relative to the other buttons, such that only one (or more than one) button can rotate from a first position to a second position while the remainder of the buttons stay in the first, unrotated position, as shown in FIG. 5*c*. Thus, one or more buttons can be rotated fully or partially around grip 31 to accommodate a particular user's limitations, comfort level, or a particular application. Accordingly, the grip can ergonomically fit the right or left hand of a user by rotating the buttons about the grip. However, the presently disclosed subject matter is not limited and the buttons can be configured as non-rotatable (e.g., stationary) in some embodiments.

Buttons 30 are modular in some embodiments. Thus, a user can remove one or more buttons 30 and replace them with a different button or set of buttons (e.g., buttons of a different shape/size, different type of button, fewer/more buttons, and/or position of the buttons). As such, the buttons can be added, adjusted, and removed as desired by a particular user and/or for a particular application.

The finger-operated buttons 30 may be disposed longitudinally on the grip 31 allowing the user to operate the buttons with the fingers. Specifically, buttons 30 may be mounted in a row longitudinally or otherwise aligned on one face of the grip and positioned such that the buttons rest under a fingertip. For example, the grip can include three buttons in some embodiments to accommodate a user's middle, pinky, and ring fingers while the pointer finger remains near the trigger for firing weapon 5. However, the arrangement of grip buttons 30 is not limited.

In some embodiments, the buttons are curved to comfortably match the bent fingers of the user during use. The placement of finger buttons 30 down one face of grip 31 removes the need for a user to adjust the placement of the fingers to operate additional actions controlled by the finger buttons. The user's palm can rest comfortably on user-facing side 16 of the grip (which can be padded in some embodiments).

Buttons 30 can be pressed by one or more fingers on a user's hand. The buttons can have a spring mechanism or compressible material under finger button to allow bias to the original button position. The buttons can be constructed from any suitable material, such as (but not limited to) rubber, plastic, or combinations thereof.

It should be appreciated that the modular buttons 30 are not limited. Specifically, buttons 30 are not limited to the round shape shown in the figures. Rather, the buttons can be configured in any shape, such as triangular, square, oval, rectangular, and the like. Further, the number of buttons is not limited, and the grip can include any desired number of buttons (e.g., 1, 2, 3, 4, 5, 6, 7, 8, 9, 10, or more).

Continuing, buttons 30 are further not limited to any particular type of button (e.g., push button). To this end, the term "button" refers to any interactive element that can be used to control an accessory device, such as a gun, drone, robot, etc. Thus, the buttons can take the form of a push button 30*a*, toggle switch 30*b*, trigger 30*c*, directional pad 30*d*, analog stick 30*e*, joystick 30*f*, touchscreen 30*g*, rollerball 30*h*, or combinations thereof as illustrated in FIGS. 6*a*-6*h*.

Figure 6A:
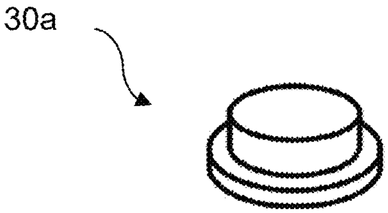
FIGS. 6*a*-6*h* are button configurations in accordance with some embodiments of the presently disclosed subject matter.
Figure 6B:
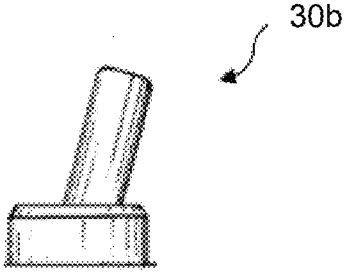
Figure 6C:
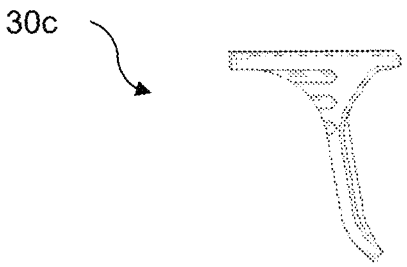
Figure 6D:
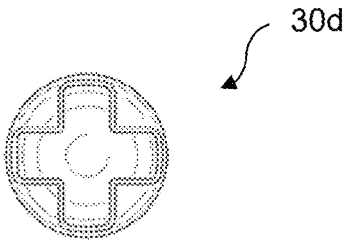
Figure 6E:
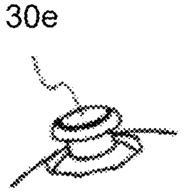
Figure 6F:
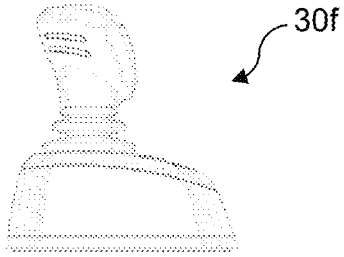
Figure 6G:
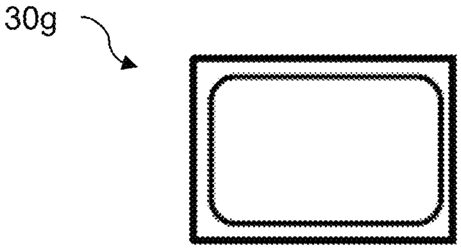
Figure 6H:

The term "push button" refers to a simple switch mechanism with a flat surface in some embodiments to accommodate the human finger or hand, as illustrated in FIG. 6*a*. "Toggle switch" refers to a switch that is manually activated by a mechanical lever, grip, or rocking mechanism, as shown in FIG. 6*b*. "Trigger" refers to a type of switch that can be initiated by actuation of a user's finger, typically in association with the firing of a weapon action, as shown in FIG. 6*c*. "Directional pad" (or D-pad) refers to a flat, typically thumb-operated, directional control that operates using four internal pushbuttons (arrayed at 90° angles in some embodiments), as shown in FIG. 6*d*. The term "analog stick" refers to an input device that includes a protrusion, where input is based on the position of the protrusion relative to a default center position, as illustrated in FIG. 6*e*. The term "joystick" refers to an input device that includes a stick that pivots on a base and reports the angle or direction of the stick relative to a neutral central position, as shown in FIG. 6*f*. The term "rollerball" refers to a pointing device featuring a ball held by a socket that includes sensors to detect rotation of the ball, as illustrated in FIG. 6*h*.

Each button 30 can be added or removed from grip 31, thereby allowing a user to customize the controller system to accommodate any of a wide variety of uses. Each button can be added or removed from the grip using conventional methods, such as (but not limited to) a snap-fit closure, magnets, the use of mechanical elements (e.g., clips, fasteners, and the like), push fit closure, or combinations thereof.

As is known in the art, each button 30 can be connected to one or more switches connected to a circuit board that sends the appropriate signals to a microprocessor. The microprocessor compares that data with instructions in the software for an accessory device that corresponds to that specific input of the pressing of the finger buttons and triggers the appropriate response.

The controller system can also include one or more thumb sticks 41, as illustrated. The term "thumb stick" refers to a joystick that can be operated using a user's thumb. The thumb sticks are positioned to allow a user holding the controller grip when attached to the weapon to use their thumb to exert controller over an accessory device (e.g., drone or robot) while leaving their remaining fingers positioned on the weapon trigger and/or on buttons 30. In some embodiments, the thumb sticks act as directional inputs. Thumb sticks 41 can be positioned on the right and/or left side of the grip to accommodate both a left or right handed user. However, the thumb sticks are optional in some embodiments.

Figure 7A:
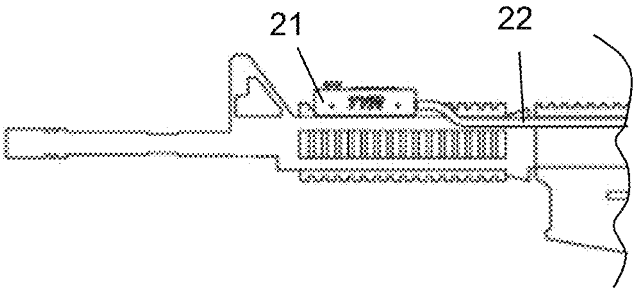
FIG. 7*a* is a side plan view of a system forward control unit in accordance with some embodiments of the presently disclosed subject matter.
Figure 7B:
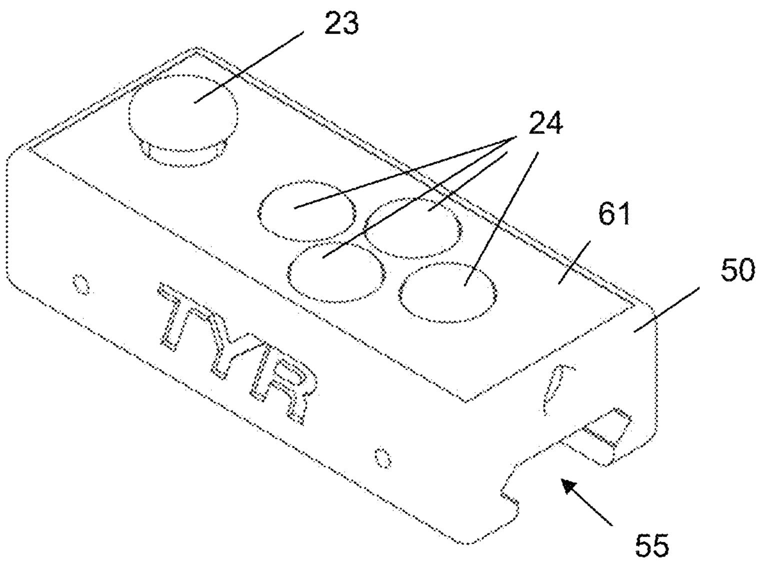
FIG. 7*b* is a perspective view of a system forward control unit in accordance with some embodiments of the presently disclosed subject matter.
Figure 7C:
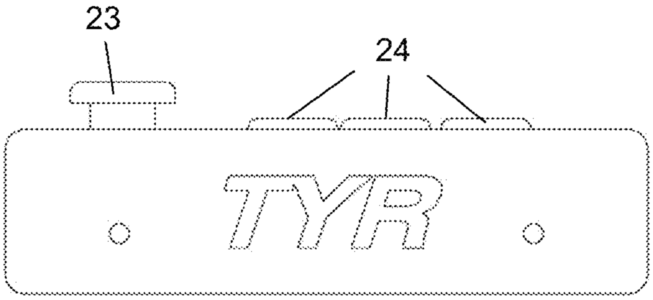
FIG. 7*c* is a side plan view of a system forward control unit in accordance with some embodiments of the presently disclosed subject matter.
Figure 8A:
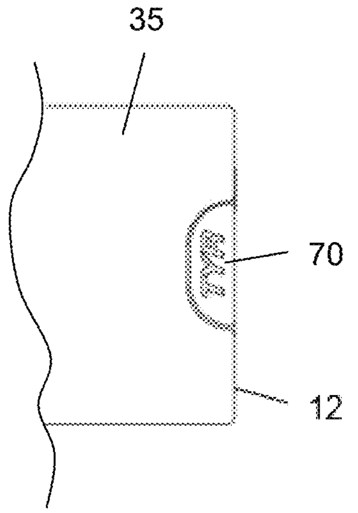
FIG. 8*a* is a side view of the circuit board inserted into a butt stock in accordance with some embodiments of the presently disclosed subject matter.
Figure 8B:
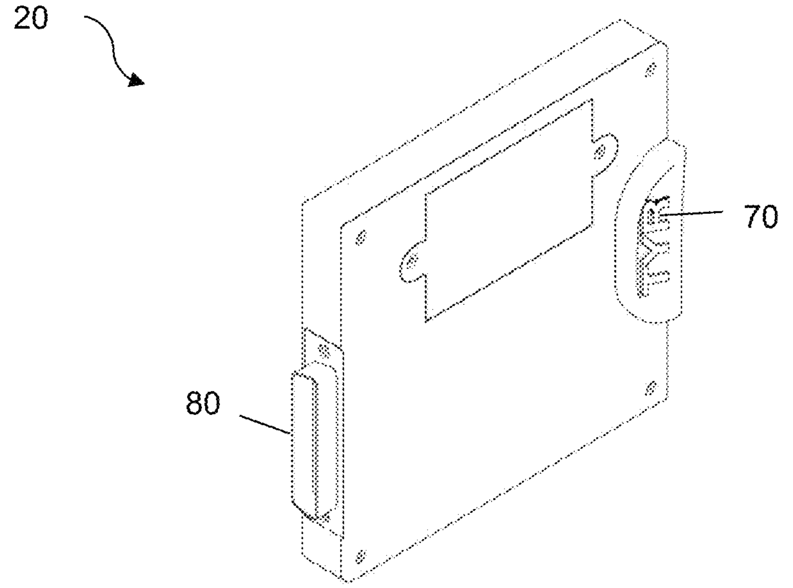
FIG. 8*b* is a perspective view of a circuit board cartridge in accordance with some embodiments of the presently disclosed subject matter.
Figure 8C:
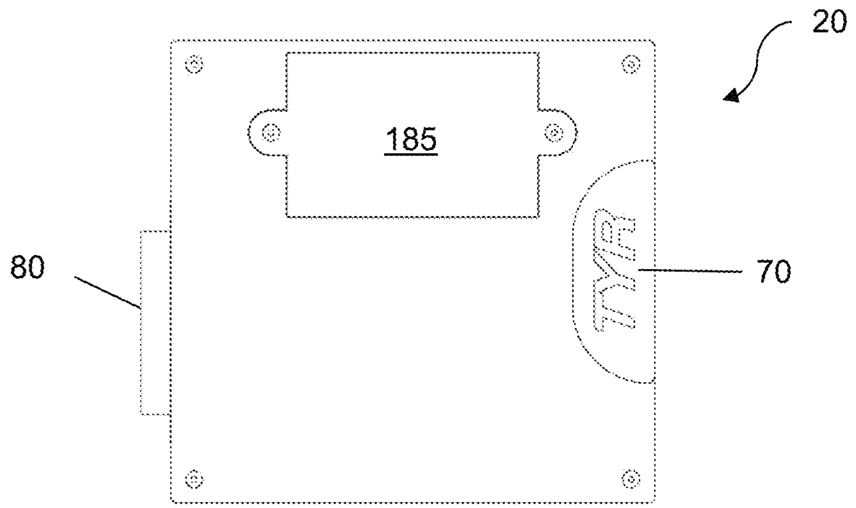
FIG. 8*c* is a right side view of a circuit board cartridge in accordance with some embodiments of the presently disclosed subject matter.
Figure 8D:
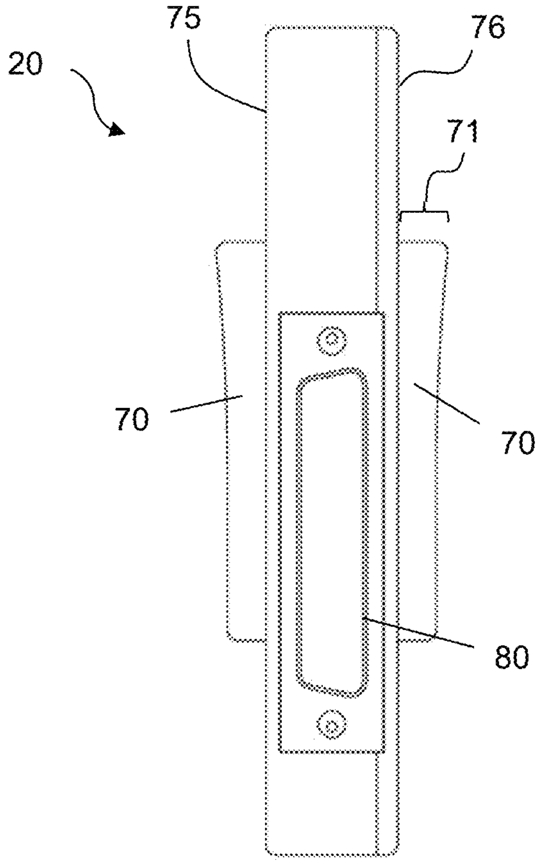
FIGS. 8*d* and 8*e* are front and rear views of a circuit board cartridge in accordance with some embodiments of the presently disclosed subject matter.
Figure 8E:
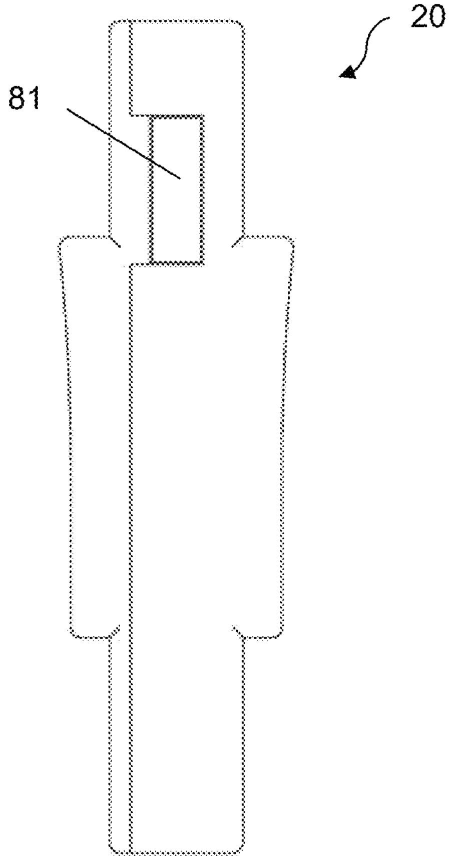

In some embodiments, the controller includes forward control 21 that can be attached to handguard 15, as shown in FIG. 7*a*. Forward control 21 can include one or more thumb sticks 23 and/or one or more buttons 24, as illustrated in FIGS. 7*b* and 7*c*. The buttons and/or thumb sticks can be positioned on top face 61 of the forward control for convenient access in some embodiments. As noted above, buttons 24 are not limited and can include any configuration of button (e.g., the types illustrated in FIGS. 6*a*-6*h*). The forward control is also modular, allowing a user to configure buttons and/or thumb sticks in any suitable orientation (e.g., any arrangement, number, type). The forward control can include outer housing 50 that allows the electrical portions to be securely stowed so that they do not become damaged. The housing includes cutout region 55 that can be an attachment point for the weapon handguard. The channel 86 accommodates wiring 22. The term "channel" refers to an elongated passage that is configured to house one or more items. As shown in FIGS. 1 and 7*a*, wiring 22 provides a communication path between forward control buttons and thumb sticks and the base (which acts as the stock) of the controller (which can include a circuit board cartridge in some embodiments).

The forward control can be attached to the handguard 15 using any standard connection (e.g., M-LOCK, picatinny rail, and the like).

As noted above, the controller can include optional circuit board cartridge 20 positioned within the interior of the base at second end 12. The circuit board cartridge can include raised region 70 as shown in FIGS. 8*a*-8*e*, allowing a user to easily add and remove the circuit board as desired. Specifically, a user can grip the raised region to insert or remove the circuit board cartridge from the controller base. The raised region can have a thickness 71 of at least about (or no more than about) 0.1, 0.25, 0.5, 0.75, or 1 inches relative to the remainder of the base. The raised region can be disposed on both left and right faces 75, 76 of the circuit board in some embodiments.

The circuit board housed within the cartridge allows a user to effectively interact with a variety of receivers (e.g., drones, weapon systems) using a single controller in addition to weapon 5 (e.g., two or more controllers are not required). In this way, users can effectively enjoy and provide input to a receiver (such as a robotics unit, drone, and the like) while also holding and/or maintaining control over a weapon.

A removable circuit board makes it easier for a user to swap between different receivers or machines because each circuit board can be prepared for a desired device, software, and/or machine. The removable circuit board ensures that transfer is much more efficient and quicker. Thus, instead of having a single dedicated circuit board that grips each aspect of the controller, a user can swap out different removable circuit boards allowing for a variety of different applications. As such, different removable circuit boards can confer different capabilities to the controller for a variety of accessory devices.

As noted above, the controller includes a variety of attachments that can be added or removed as desired, allowing the controller to be used with different accessories. To this end, the cartridge can include contact 80 that enables releasable attachment of an associated accessory using any suitable mechanism such as snap fit, push fit, magnets, mechanical elements, and the like. Thus, in some embodiments, an accessory can include a male component that cooperates with a corresponding female component within contact 80 although any attachment mechanism can be used (e.g., snug-fit, snap-fit, or clamp connection). Thus, the mounting contact on the top or bottom face of the circuit board cartridge can include any suitable surface, feature, shape, and/or structure configured to selectively mate with the mounting interface of an attachment.

In some embodiments, the contact can include a power connection, transmitting power to an accessory from the controller. Connection of an accessory to the base of the controller can therefore be accomplished by releasably pairing the two items together until a user desires to remove the accessory (e.g., to replace it with a different accessory).

The cartridge can also include power button 81 and battery compartment 185 in some embodiments, although it should be appreciated that these are optional features.

Figure 9A:
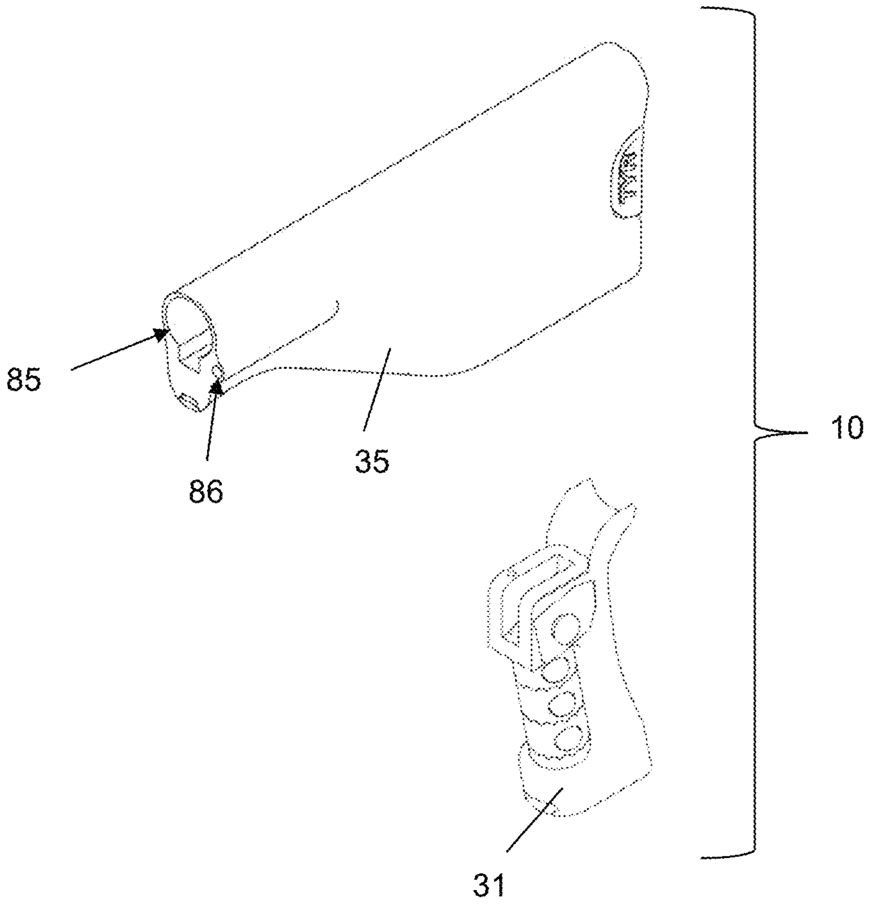
FIG. 9*a* is a perspective view of a controller system in accordance with some embodiments of the presently disclosed subject matter.
Figure 9B:
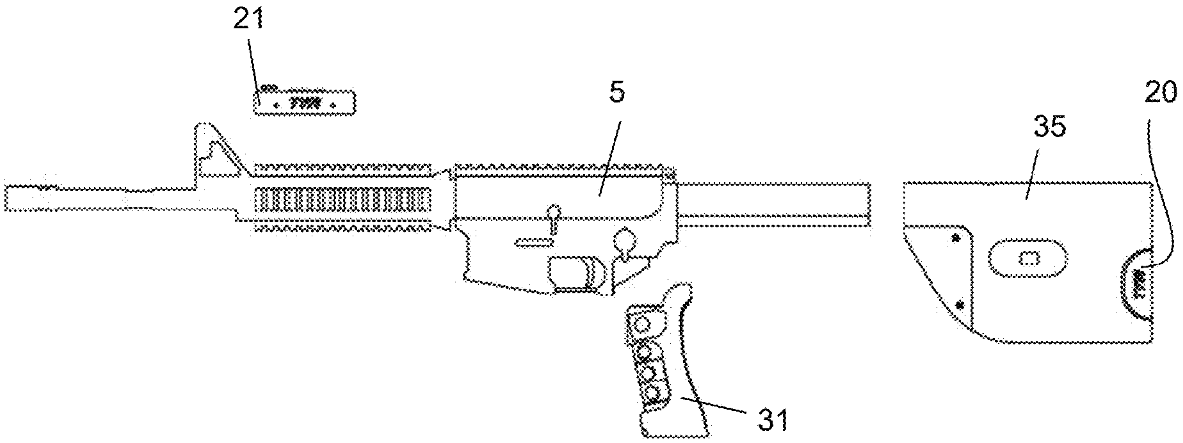
FIG. 9*b* is an exploded side view of a weapon that includes a controller system in accordance with some embodiments of the presently disclosed subject matter.
Figure 9C:
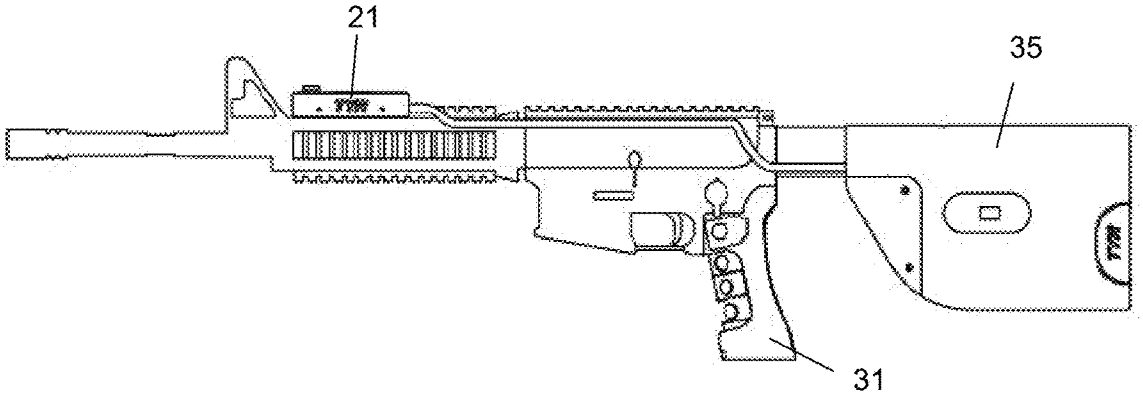
FIG. 9*c* is an assembled weapon that includes a controller system in accordance with some embodiments of the presently disclosed subject matter.

Although shown as a single unit with the grip and base connected, the controller can also be configured and attached to a weapon in multiple separate units, as shown in FIGS. 9*a*-9*c*. For example, the base can be attached to weapon 5 separately and independently from grip 31. Optionally, the forward controls can be separately attached as illustrated. Thus, not all firearms use a fixed buttstock and instead utilize an adjustable buttstock. It should therefore be appreciated that the controller can have a wide variety of configurations.

Controller 10 can be powered using any suitable mechanism. For example, the controller can include one or more battery compartments for receiving and holding rechargeable or non-rechargeable batteries. The battery compartment may include one or more electrodes (e.g. conventional electrodes) that are configured to contact electrically conductive surfaces of the battery received inside the compartment. The battery compartments are selectively accessible by removal of a latch cover whereby the battery compartments and the batteries are accessible only when the player removes a removable battery cover or latch mechanism concealing the battery compartment from external view. In other embodiments, at least one power source may comprise a power connector. The power connector may include an external power cable which may be plugged into an outlet. The circuitry can also be connected to the control through a cable attached to a control board in a backpack or pouch. Specifically, the circuitry can be external to the system, while the controls remain within the system. In these embodiments, the circuitry can be carried or held by a user in a pouch, backpack, or any similar item. The circuitry can be wirelessly connected to the controls and/or via a cable or other physical connection to allow for communication.

Controller 10 can be constructed from any desired material, such as (but not limited to) one or more rigid materials selected from carbon fiber, plastic (such as injection-molded polycarbonate (PC)/acrylonitrile butadiene styrene (ABS) or polyamide (nylon)), metal (e.g., stainless steel), or combinations thereof. The material may be selected based on one or more of heat resistance, mechanical strength, or rigidity for continuous use without degradation or deformation of the controller.

Controller 10 can be manufactured by methods of injection molding, 3D printing, or other suitable manufacturing methods.

In use, the controller replaces conventional butt stock and pistol grip portions of a weapon (e.g., firearm). As noted above, weapon 5 is not limited. Suitable examples can include (but are not limited to) the M16, M4, and AR15 type rifles. However, the controller can be configured to mount to other styles of firearms that include a removable stock, pistol grip, and that provide a location for mounting. For example, the grip buttons and thumb sticks can be positioned at any suitable location, so long as there is an attachment point for each element on the forward handguard. Rifle handguards often have attachment points on top, bottom, left, and right such that the buttons and thumb sticks can include several possible positions.

To install the controller on a weapon with the butt stock and pistol grip removed, the base includes opening 85 that accepts a corresponding weapon buffer tube (or adjustable stock mount on the adjustable stock configuration). The term "buffer tube" refers to a housing that is attached to a weapon (e.g., rifle). The buffer tube can include an AR15 buffer and a recoil spring, helping to absorb recoil and cycle the action of the weapon. Buffer tubes also act as mounting points for a buttstock or pistol brace in conventional weapons. The base can be maintained in proper position on weapon 5 using any suitable mechanism, such as mechanical elements (e.g., screws, bolts), welding, snap fit closure, and the like.

The base also includes channel 86 that provides a pathway for accommodating wiring 22 for the forward controls and/or the wiring for the grip controls. The channel can be positioned at any location, such as directly adjacent to opening 85 in some embodiments.

The pistol grip attaches to the receiver or the body of the weapon with any suitable attachment (e.g., screw or bolt). In some embodiments, the grip is molded into the main body of the weapon. In these embodiments, the device would require replacing the main body of the weapon (e.g., firearm). The wires come from channel 86 in some embodiments. In the one-piece version of the disclosed system 10, the wires follow internal pathways.

It should be appreciated that different firearms enable different methods of attachment of the controller. The controller system in any configuration can attach to a designated firearm in a standard way. As with the forward handguard on the rifle illustrated in FIG. 1, different handguard options can utilize many attachment styles (e.g., key-mod, m-lock, and picatinny). Similarly, there are several different ways to attach a butt stock to a weapon. As a result, controller system 10 can include any of a wide variety of attachment mechanisms, allowing for connection to an array of different weapons.

As noted above, controller 10 can be customized to include any suitable arrangement of buttons and thumb sticks on grip 31 and forward control 21. Thus, any location or combination of buttons, triggers, directional pads, analog sticks, joysticks, touch screens, rollerballs, and the like can be used.

Once controller system 10 is permanently or releasably attached to a weapon, the weapon retains normal function. Thus, a user can grasp grip 31 to access the gun's trigger when needed. The controller system further enables a user to control other accessory devices while maintaining the normal hand placement locations on the weapon. Thus, the user's normal hand position allows a user to easily access the trigger on a firearm, while also allowing the user's fingers to travel to grip buttons 30 to control a secondary device. The user's other hand (non-trigger hand) can also access the forward control buttons to control the same or a different accessory device).

In some embodiments, the controller grip is grasped by a user's left or right hand. The user's fingers can wrap around the grip such that the trigger finger has access to the gun's trigger, while the remaining fingers have access to the grip buttons. The user's thumb has access to the thumb stick. As noted above, the buttons may be rotated about the base as desired to increase comfort and/or accommodate a particular application or user preference. One or more accessory devices can be controlled by the user. For example, a desired first accessory device can be controlled by grip 31, while a second accessory device (or the same accessory device) can be maneuvered or controlled by forward controls 21.

The controller advantageously provides all the possible buttons for a desired application on one device, accessible by the fingers of a user's hands. Stated another way, controller 10 allows the fingers of a user's hands to reach any button on the controller (as opposed to requiring both hands and multiple controllers for effective use). Further, the buttons on the grip and forward controls can be arranged as desired for best results either in specific applications or depending on what the user finds most comfortable.

Once the controller has been assembled, the user can depress buttons or otherwise manipulate the buttons to generate certain input signals to control an associated device (e.g., drone) while also maintaining control over weapon 5.

Essentially, controller 10 facilitates interaction between a user and a secondary device (such as a drone, vehicle, robotic element, etc.). Thus, the hand-held controller serves as a peripheral device to give input to a receiving device. The receiving device is capable of running and executing a program (such as guidance of an airborne drone) with which the user interacts by operating the controller. The receiving system can be a personal computer (PC), a smartphone, robotics console, aviation device, or any other system capable of running and executing a program. Advantageously, hand-held controller 10 can be operated with a user's hands to provide input to a computerized machine (or receiver) that interfaces with and provides inputs to a program running on a computing device. Further, the disclosed controller includes a set of modules for either left handed or right handed use, allowing a person with the use of only one arm/hand to take full advantage of the controller.

The presently disclosed subject matter offers many advantages over prior art weapons and systems. For example, system 5 can replace the pistol grip and stock of a firearm, allowing a user to control a secondary device (or devices) in addition to the firearm.

The disclosed system allows a user to more efficiently control a plurality of devices while still holding a firearm using buttons 30 and thumb sticks 41. Thus, a single controller has all of the features (e.g., buttons and capabilities) of conventional dual controllers.

The controller system is modular, allowing a user to configure the grip and/or forward controls using any combination, number, arrangement of buttons and thumb sticks. In this way, the controller can comfortably be used and account for a variety of user preferences.

The disclosed system allows for added user efficiency by ensuring that a user is not required to place a weapon in a support location (e.g., on the ground and out of the user's hand/control) when operating the accessory device(s). Instead, the user can maintain control of the weapon with a finger on or adjacent to the weapon trigger, while also maintaining control of the grip and forward control buttons and thumb sticks to control one or more accessory devices simultaneously.

The disclosed system is versatile and be installed and used on a wide variety of weapons.

Controller 10 is simple to use and install on an associated weapon, requiring little training.

The disclosed controller is also durable, allowing for continued long term use by an operator.

Controller 10 is ergonomically shaped, providing for comfortable use in the right or left hand of a user.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A controller system for installing on a weapon, the controller system comprising:

a grip defined by a front face comprising one or more buttons and a rear face;

a base comprising a first end defined by an opening and a channel and an opposed second end;

wherein when installed on a weapon, the grip buttons are accessible by a middle finger, ring finger, and pinkie finger of a user while a pointer finger of the user is positioned adjacent to a trigger of the weapon, allowing a single hand of the user to access the grip buttons and the trigger of the weapon;

wherein the grip buttons control a feature of an accessory device;

wherein the weapon has an original buttstock and pistol grip removed and replaced by the grip and base.

2. The controller system of claim 1, comprising three buttons.

3. The controller system of claim 1, wherein the grip further includes a thumb stick accessible by a thumb of a user while the pointer finger of the user is positioned adjacent to the trigger of the weapon.

4. The controller system of claim 1, further comprising a forward control comprising a second set of buttons, a thumb stick, or both, where the forward control is positioned on a handguard of the weapon.

5. The controller system of claim 1, wherein the weapon is a gun.

6. The controller system of claim 1, wherein the accessory device is selected from one or more drones, robotic devices, aircraft, artificial satellites, unmanned aerial vehicles, cameras, self-driving vehicles, weapon arrays, sensors, information/communication devices, ground and underwater equipment, probes, or combinations thereof.

7. The controller system of claim 1, wherein the base includes an interior that houses circuitry of the buttons.

8. A gun comprising the controller system of claim 1.

9. A method of using the controller system of claim 1, the method comprising:

installing the base on the weapon;

installing the grip on the weapon adjacent to the weapon trigger;

whereby the grip buttons are accessible by the middle finger, ring finger, and pinkie finger of the user while the pointer finger of the user is positioned adjacent to the weapon trigger;

wherein the grip buttons are used to control a feature of the accessory device.

10. The method of claim 9, wherein the grip of the controller system includes a thumb stick accessible by a thumb of a user while the pointer finger of the user is positioned adjacent to the trigger of the weapon.

11. The method of claim 9, wherein the controller system comprises a forward control comprising a second set of buttons, a thumb stick, or both, where the forward control is positioned on a handguard of the weapon.

12. The method of claim 9, wherein the weapon is a gun.

13. The method of claim 9, wherein the accessory device is selected from one or more drones, robotic devices, aircraft, artificial satellites, unmanned aerial vehicles, cameras, self-driving vehicles, weapon arrays, sensors, information/communication devices, ground and underwater equipment, probes, or combinations thereof.

14. The method of claim 9, wherein the base includes an interior that houses circuitry of the buttons.

15. The method of claim 9, wherein by installing the base on the weapon comprises positioning a weapon buffer tube within the base opening.

* * * * *